Aug. 29, 1967 S. G. VARSOS 3,339,142

ADAPTIVE PULSE TRANSMISSION SYSTEM WITH MODIFIED DELTA MODULATION AND REDUNDANT PULSE ELIMINATION

Filed July 1, 1963 7 Sheets-Sheet 1

INVENTOR
SPYROS G. VARSOS

BY Julian C. Renfro
ATTORNEY

INVENTOR.
SPYROS G. VARSOS
BY Julian C. Renfro
ATTORNEY

Aug. 29, 1967 S. G. VARSOS 3,339,142

ADAPTIVE PULSE TRANSMISSION SYSTEM WITH MODIFIED DELTA MODULATION AND REDUNDANT PULSE ELIMINATION

Filed July 1, 1963 7 Sheets-Sheet 3

INVENTOR.

SPYROS G. VARSOS

BY Julian C. Renfro

ATTORNEY

INVENTOR.
SPYROS G. VARSOS
BY Julian C. Renfro
ATTORNEY

INVENTOR.
SPYROS G. VARSOS
BY Julian C. Renfro
ATTORNEY

INVENTOR.
SPYROS G. VARSOS
BY Julian C. Renfro
ATTORNEY

INVENTOR.
SPYROS G. VARSOS
BY Julian C. Renfro
ATTORNEY

United States Patent Office 3,339,142

Patented Aug. 29, 1967

3,339,142

ADAPTIVE PULSE TRANSMISSION SYSTEM WITH MODIFIED DELTA MODULATION AND REDUNDANT PULSE ELIMINATION

Spyros G. Varsos, Orange County, Fla., assignor to Martin-Marietta Corporation, Middle River, Md., a corporation of Maryland Filed July 1, 1963, Ser. No. 291,809

6 Claims. (Cl. 325—38)

This invention relates to a pulse modulation communication system which transmits incremental changes of the modulating signal from one sample to the next sample, and more specifically to a pulse communication system which does not require a symmetric channel with respect to errors. Additionally, this invention may incorporate means for greatly reducing the number of transmitted pulses for a given fidelity of modulating signal reproduction.

As is well known in the prior art, pulse transmission systems have been developed which transmit sequences of pulses at regularly spaced intervals or sampling times such that incremental modulation information is carried by changing the polarity of certain of these pulses, or by omission of certain of these pulses. The main advantage of such systems is that the receiver may be gated or made inoperative except when such pulses are expected to occur. This naturally reduces the amount of interference which can affect the pulses. While some advantages are obtained by these prior art techniques, certain disadvantages are unavoidably present. For example, these systems generally transmit a pulse to indicate one polarity of change in the input signal, and the absence of a pulse to indicate a change of the opposite polarity. For such purposes the presence of a pulse may be indicated erroneously by noise or interference and the absence of a pulse may be noted erroneously by a fading of the received pulse. These two different types of errors are known as commissive and omissive errors respectively. It is essential in such devices that the decision circuit in the receiver be adjusted to provide equal commissive and omissive errors, for if this is not done, the output of the decision circuit becomes weighted toward the predominant type error and the received signal error will build up in that direction causing an undesirable DC bias. The type of decision circuit producing equal commissive and ommissive errors provides what is known as a symmetric channel, but its use presents a limitation in arriving at an optimum communication system since the decision threshold must be set by this symmetric requirement rather than for an optimum decision rule. In prior art systems of this type, the circuits may be adjusted to provide a symmetric channel but dynamic changes in the transmission medium can quickly occur and the undesirable non-symmetry results.

Therefore, one object of the present communication system is to eliminate the requirement for a symmetric channel, thus allowing optimum decision techniques to be employed without regard to the type of error which might then predominate in the implementation of the detector section of the communication system and to allow the communication system to adapt itself to changing degrees of error non-symmetries due to unavoidable variations in interference in the transmission medium.

Prior art communication systems which transmit differential modulation information have other disadvantages. For example, these incremental modulation techniques require sampling rates, and consequently pulse rates, several times greater than the highest information frequency to be transmitted in order to faithfully reproduce the information. The large number of pulses being carried by the transmission medium limits the number of channels which can be accommodated by multiplex methods. Also, the average transmitter power is proportional to the number of pulses required.

Accordingly, another object of the present invention is to greatly reduce the number of pulses required for the transmission of the desired incremental modulation. This results in a reduction of the average transmitter power and several other desirable advantages to be described hereinafter.

Recent advances in the communication art have produced systems known as random access communication systems. In a random access system such as the patent application of McKay Goode entitled, "Discrete Address Communication System with Random Access Capabilities," Ser. No. 107,194, filed in the U.S. Patent Office on May 2, 1961, and assigned to the assignee of the present invention, (now Patent No. 3,239,761), many telephonic type voice conversations may be carried on between radio frequency sets operating in the same wideband portion of the radio frequency spectrum by uniquely coding each separate transmission such that only the receiver to which this signal is directed will respond. This system and similar types utilize pulses, and the successful operation of such systems is limited by the total pulse density in the transmission medium. It is a further object of the present invention to provide a higher number of conversations in such random access systems than previously possible by virtue of a reduced pulse density in the transmission medium.

A desirable feature of many types of voice communication systems is that the transmitter be responsive to the operator's voice and not require manual operation of a switch for transmission. In the past, various types of voice operated switches, either electric or electromechanical, have been necessary to accomplish this feature. Another object of the present invention is to provide a voice operated switch characteristic in a pulse transmission system with no auxiliary or additional equipment. Furthermore, this voice operated switch feature provides an instantaneous response which eliminates any loss of information associated with long time-constants unavoidably present in prior art switches. According to this feature of the invention, advantage is taken of the statistics of speech according to which many breaks and pauses commonly occur which carry no information to the user. During such breaks and pauses, the instantaneous voice operated switch characteristic of the present invention inhibits the transmission of pulses, thus in part achieving an additional reduction in pulse density which is one of the primary objects of the present invention.

As is therefore to be seen, the present invention relates to a pulse transmission system for transmitting signals representing approximately a complex input waveform and comprises means for generating an approximate local waveform, as well as means for comparing the amplitude of said local waveform and said complex input waveform and for generating pulses constituting a first pulse stream in accordance with the result of said comparison of said waveforms. Means for generating a reference waveform varying periodically between two amplitude levels are provided, as are comparator means for comparing said first pulse stream with said reference waveform, with the comparator means including means for producing in said comparison of said pulse stream and said reference waveform a second pulse stream substantially different from said first pulse stream. Receiving means are provided for receiving said second pulse stream, said receiving means comprising reference waveform generator means generating a receiver reference waveform. Means are also provided for comparing said receiver reference waveform with said second pulse stream, said comparison producing a receiver pulse stream substantially the same as the said first pulse stream. Stepping waveform generator means are arranged to accept said receiver pulse stream and be respective thereto, said waveform generator means effectively reconstructing said complex input waveform in response to said receiver pulse stream.

These and other objects, features and advantages will be more apparent upon study of the appended drawings in which.

Figure 3:
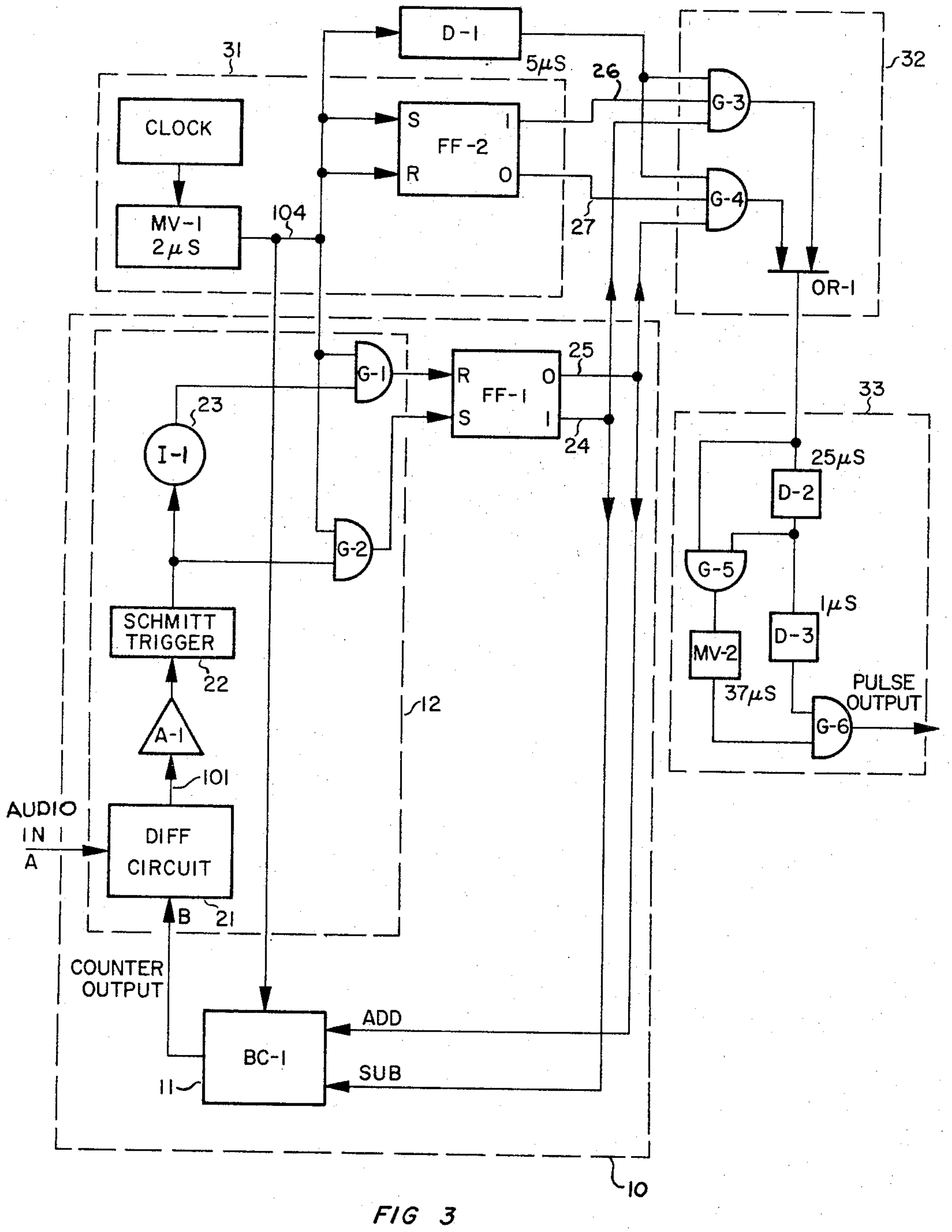
FIGURE 3 is a detailed block diagram of a preferred embodiment of the pulse encoding section of the transmitter.
Figure 4A:
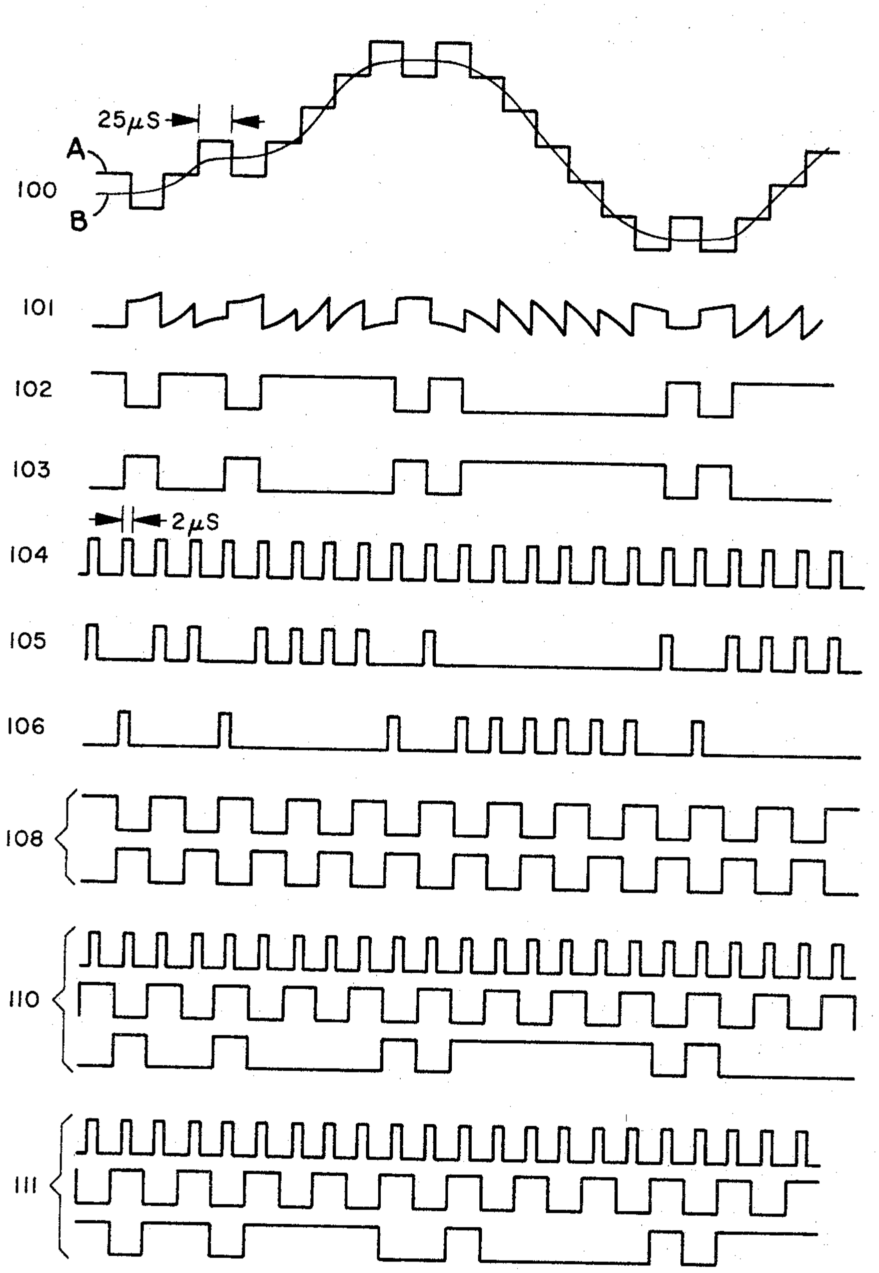
Figure 4B:
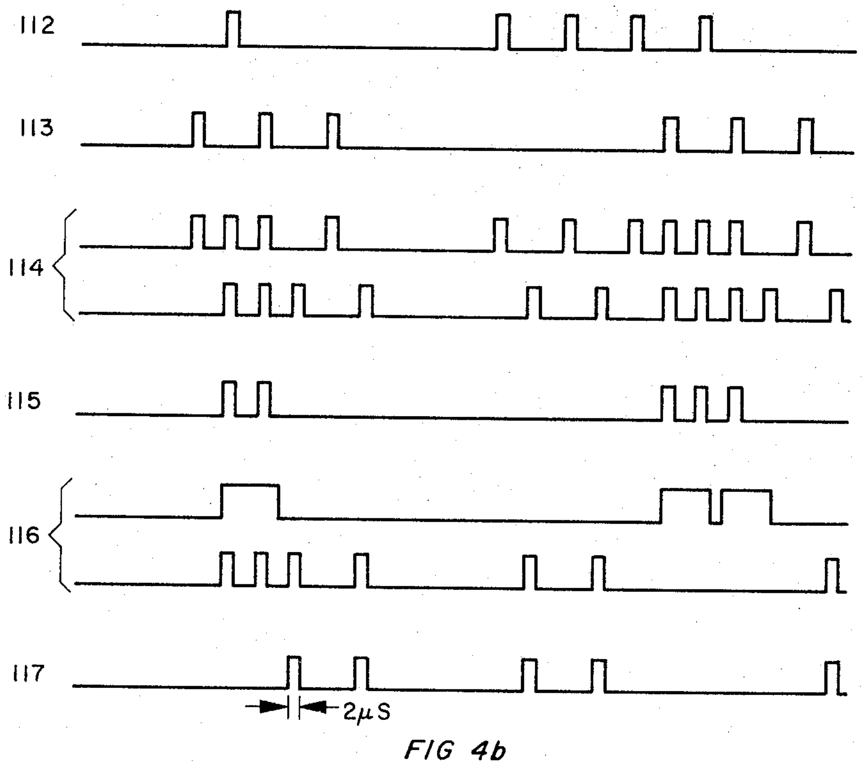
Figure 5A:
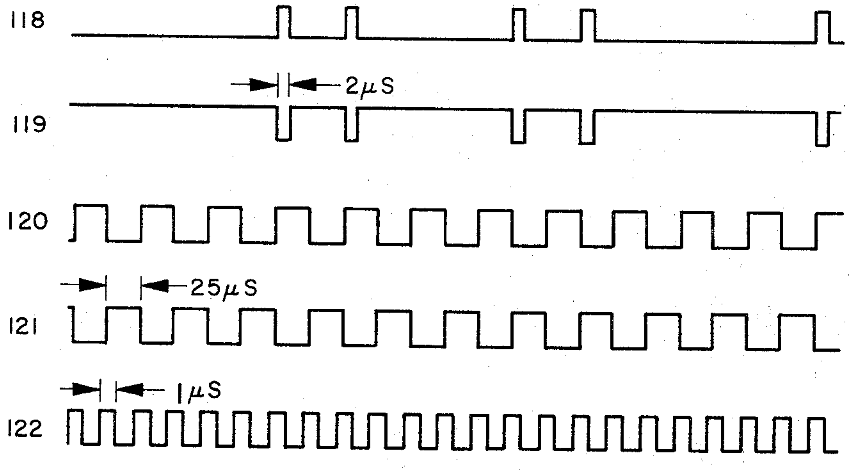
Figure 5B:
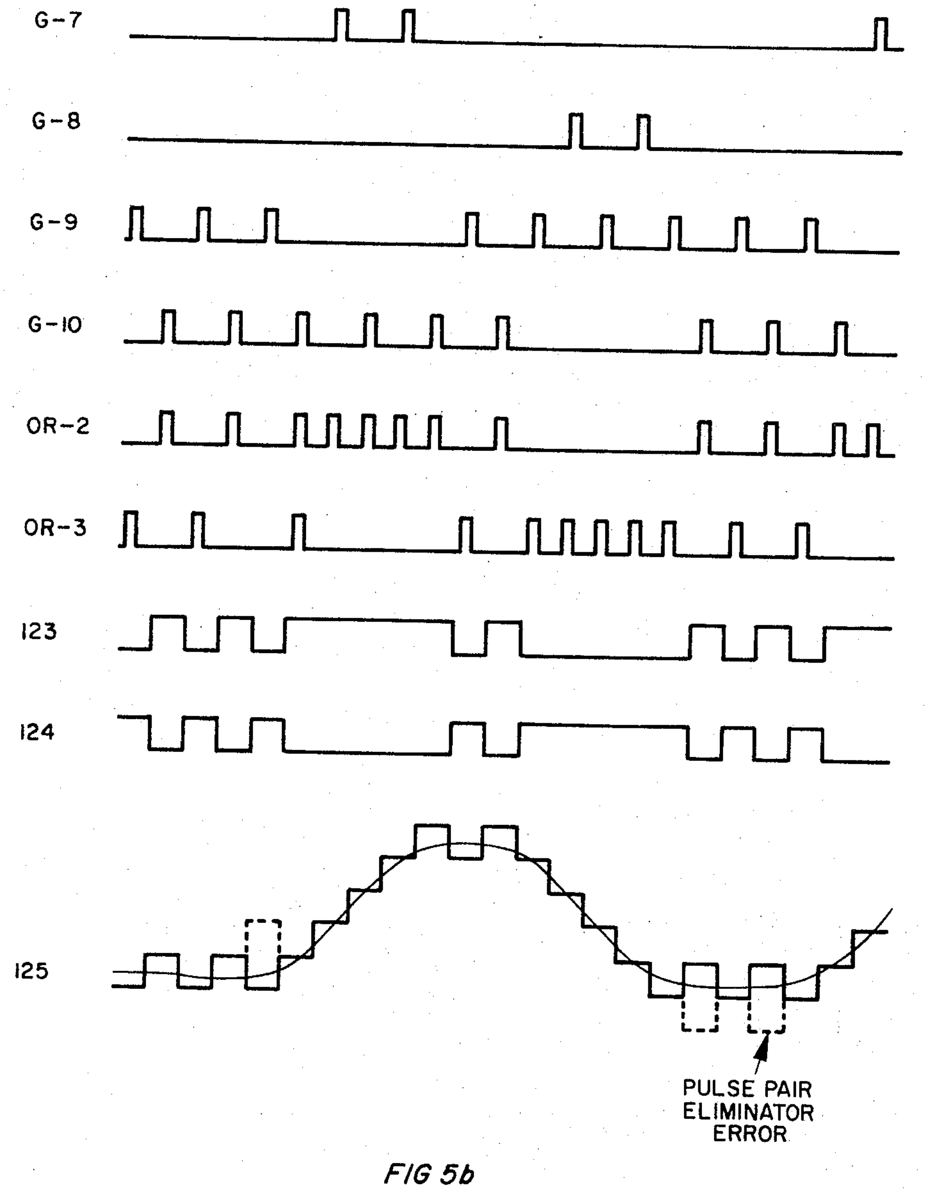
Figure 6:
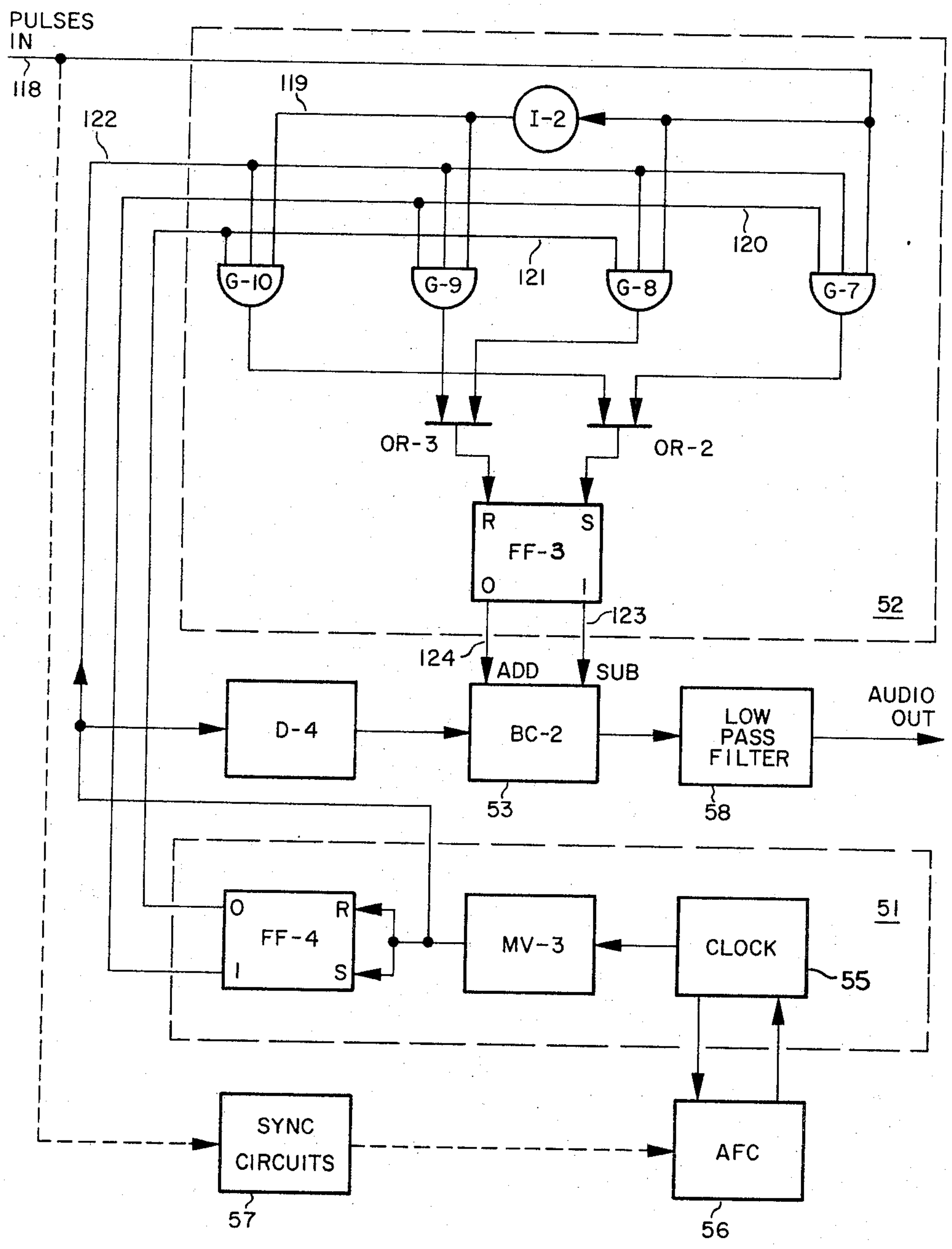

FIGURES 4*a* and 4*b* represent typical waveforms present at various points in the embodiment set forth in FIGURE 3;

FIGURES 5*a* and 5*b* represent typical waveforms corresponding to the waveforms of FIGURES 4*a* and 4*b*, subject waveforms being present at certain points in the decoding circuits; and FIGURE 6 is a detailed block diagram of a preferred embodiment of the pulse decoding section of the receiver.

Figure 1:
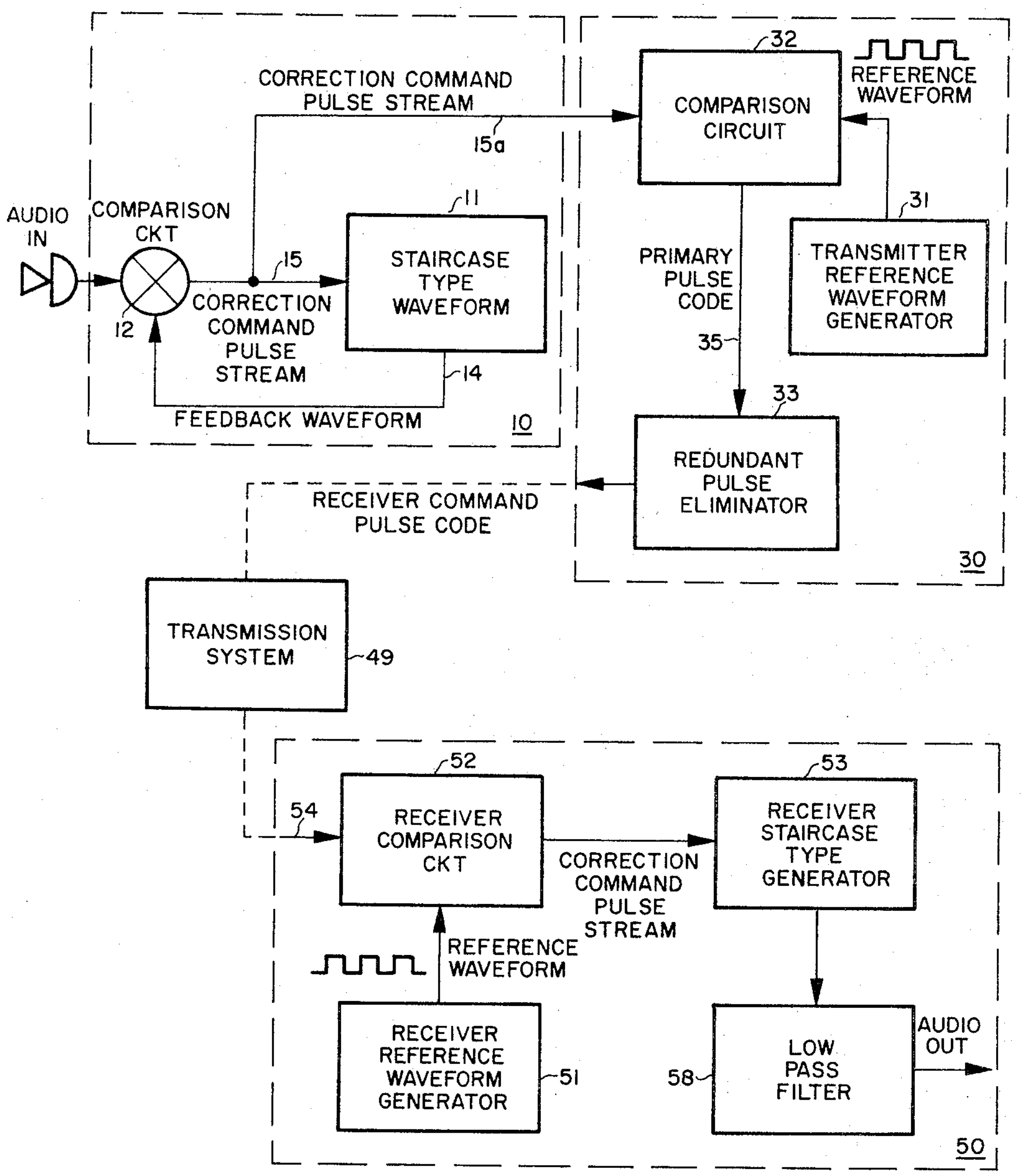
FIGURE 1 is a simplified functional diagram of the transmitting and receiving system in accordance with this invention.

Referring to FIGURE 1 a simplified functional diagram of the transmitting and receiving elements of the present invention is shown, comprising audio circuit 10, encoder circuit 30, and receiver circuit 50. Audio circuit 10 accepts an audio input and generates a staircase-type representation of the incoming audio waveform for the purpose of evolving a waveform for subsequent encoding as will hereinafter be seen.

Staircase type generator 11 used in audio circuit 10 is a well known device comprising a reversible binary counter and clock means for triggering the counter at a desired sampling rate. The fidelity with which this staircase-type reproduction is generated is a function of the sampling rate chosen, such that each stairstep represents a quantum level in accordance with the features of this invention. The staircase type reproduction of the audio waveform is accomplished in audio circuit 10 by comparing in the comparison circuit 12 the output of the staircase generator 11 appearing on lead 14, which is utilized as a feedback waveform. The stepping action of the staircase generator is controlled by a correction command pulse stream generated in comparison circuit 12, the output from latter being connected by lead 15 to generator 11. As will be seen hereinafter in detail, this correction command pulse stream instructs the staircase generator to step up or down as required to match voltage-wise the audio input wave in the comparison circuit as nearly as possible. The audio circuit 10 therefore has the sole purpose of generating for external use the aforementioned correction command pulse stream appearing on lead 15; the staircase type reproduction of the audio wave is used only as a means of generating this correction command pulse stream. The correction command pulse stream on lead **15*a* is an input to comparator means in the form of comparison circuit 32**, which is an essential part of the encoder circuit to be discussed. However, in order to make clear certain fundamental features of this invention, portions of the receiver will now be considered.

A staircase generator 53 identical to generator 11 is used in receiver 50 to generate a staircase waveform which must be as nearly as possible identical to the staircase type reproduction of the audio waveform produced by the transmitter staircase generator 11. It may be seen that if the correction command waveform from audio circuit 10 were used to drive the receiver staircase type generator 53 directly, then its output would be identical with the feedback waveform output of the transmitter staircase type generator 11 as desired. However, this arrangement would cause the system to be sensitive to non-symmetries of false alarm and miss errors as is the case in prior art systems. In accordance with this invention, therefore, the system is made insensitive to such non-symmetries by an alternate change in the command signal transmitted to the receiver so that both types of errors will have the same effect on the system over normal message duration times.

In order to accomplish the aim of eliminating sensitivity to this type of error, a unique coding system is used in the transmitter and a corresponding decoding system is used in the receiver ahead of staircase generator 53. The transmitter encoder 30 consists in its most elemental form of the aforementioned comparison circuit 32 and a reference waveform generator 31. An important feature of this invention is a redundant pulse eliminator 33 also shown as part of encoder 30, the details of which will be described more fully hereinafter.

Referring again to the correction command pulse stream on lead **15*a*, this waveform will consist of a sequence of 1's when generator 11 is stepping up, a sequence of 0's when generator 11 is stepping down and alternate 1's and 0's when generator 11 is required to maintain a constant level. The transmitter reference waveform generator 31 produces square waves at the same rate and in synchronism with the clocking means of generator 11 by virtue of being driven from the same basic oscillator. In the comparison circuit 32, which may be a logic circuit of the "exclusive OR" type, the presence of a 1 on lead 15*a* and a 1 from the reference waveform generator 31 will produce a 1 at its output; a 00 will also produce a 1 while a 10 or 01 will produce an output 0. The pulse stream output on lead 35 from comparison circuit 32** is referred to as the primary pulse code and will consist of an alternate sequence of 1's and 0's when the correction command waveform consists of a sequence of either all 1's or all 0's. If the correction command waveform consists of alternate 1's and 0's, then the primary pulse code will be a sequence of either all 1's or all 0's. Thus, the desirable feature of producing a code insensitive to type of error has been accomplished; i.e., the meaning of a 1 or a 0 is reversed periodically and repetitive errors of the same type, therefore, cannot build up undesirable biases on the signal.

By-passing for the moment a discussion of the pulse eliminator 33, the receiver decoding process will be described. The decoder in the receiver 50 is comprised of receiver reference waveform generator 51 and receiver comparison circuit 52. These circuits are the receiver counterparts of the transmitter waveform generator 31 and comparison circuit 32. Receiver waveform generator 51 produces square waves of the same frequency and in synchronism with transmitter reference waveform generator 31. The method of synchronism is not considered pertinent to the present invention; however, it may consist of a narrow band filter to extract the frequency and phase information from the received pulse stream and a phase-locked loop to control the receiver basic oscillator such that the required synchronism is obtained.

Referring to the receiver comparison circuit 52, the receiver command pulse code on lead 54 is one input to the comparison circuit. For purpose of explanation, this input will be assumed to be identical with the primary pulse code output of comparison circuit 32 and assumed to have passed through the transmission medium with no error and with no change brought about by the pulse eliminator. The other input of comparison circuit 52 is the reference waveform from generator 51.

The comparison operation produces at the output of comparison circuit 52 a receiver command pulse stream which serves to cause the receiver staircase generator 53 to step up and down. The comparison operation in the receiver is the inverse of the comparison operation of the encoder section 30 of the transmitter. Thus, the receiver correction command pulse stream will be identical to the correction command pulse stream of transmitter audio circuit 10 and the stepping waveform generator 53 will follow exactly the transmitter generator 11.

It may be noted here that a pulse transmitted to the receiver to require the staircase waveform of the receiver to step up for example may, on another occasion, require the staircase waveform of the receiver to step down. In other words, the repetitive square wave type reference waveform changes the meaning of a received pulse periodically at the sampling rate. This serves to accomplish one object of this invention with respect to the effect of commissive and omissive errors. A commissive error may, in one case, cause the staircase waveform to incorrectly step up, while in another case, it may cause the staircase waveform to erroneously step down. Assuming the errors are random, then on the average both omissive and commissive errors will have the same effect on the system and therefore in accordance with this invention are not required to be symmetrical.

Returning to the encoder, the pulse train output of comparison circuit 32 is considered to be a primary pulse code and may in fact be several pulses in sequence, several zeros (or absence of pulses) in sequence or various combinations of pulse presence and pulse absence. In accordance with further objects of this invention, certain of these primary pulse code pulses are found to be redundant and advantageously can be omitted with only minor degradation of audio quality. The redundant pulse eliminator 33 provides means of eliminating such redundant pulses, and its operation will subsequently be explained in detail.

In order to more fully explain the modus operandi of this invention, the production of the primary pulse code in the transmitter will now be described, followed by a description of the method of eliminating redundant pulses.

Figure 2:
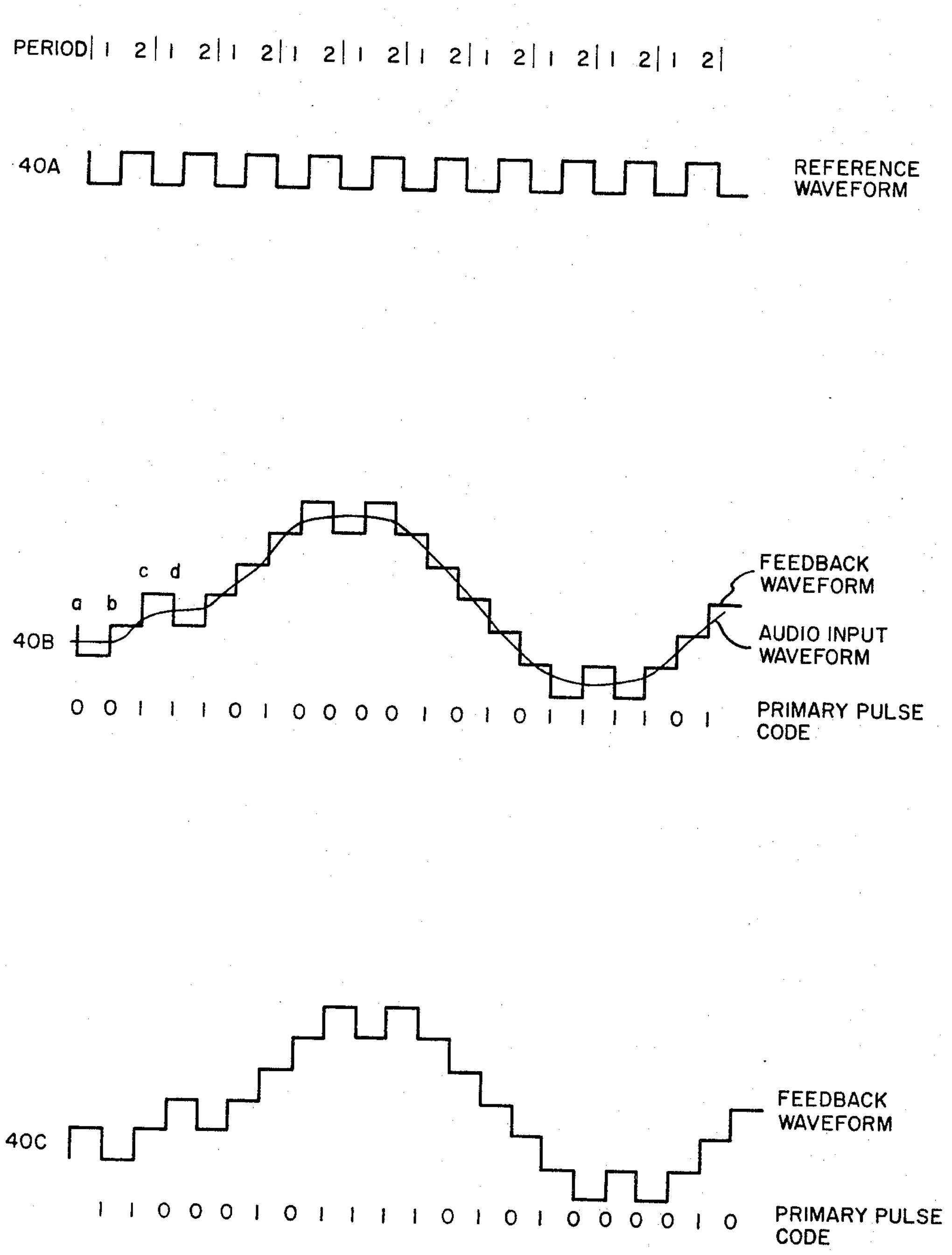
FIGURE 2 is a waveform diagram illustrating a vital step in the information encoding process.

The sample periods representing the time intervals between samples of the modulating waveform will first be considered in pairs. For example, a 40 kc./s. rate results in a 25-microsecond period. There is no significance to the starting point of these pairs as will be clear from the following description. The two periods will be referred to as the first period and second period. The locally generated transmitter reference waveform is considered to be a train of uniform rectangular pulses as shown in FIGURE 2, line 40A. In accordance with the comparison of the incoming audio waveform to the feedback waveform at the sampling times, the feedback staircase waveform on lead 14 is stepped up or down at the sampling time. A pulse is generated at the output of the comparison circuit 32 in accordance with a logic truth table as follows:

DIRECTION OF UNIT STEP

| | First Period Normally Down | Second Period Normally Up |
|---|---|---|
| Presence of Pulse | Up | Down. |
| Absence of Pulse | Down | Up. |

For the purposes of illustration the presence of a pulse will be noted as a 1 and the absence of a pulse as 0. In practice, any desired representation of a 1 or a 0 may be utilized.

According to the above truth table, if the feedback staircase waveform steps up during a given period one, a 1 is generated at the output of the comparison circuit 32. If the feedback waveform steps down during such first period, a 0 is generated. During the immediately following second period, this order is conveniently reversed in accordance with this invention such that if the feedback waveform steps up, a 0 is generated and if the waveform steps down a 1 is generated. In other words, reversal is brought about to obviate the need for a symmetric channel. To more fully explain this action by means of an exemplary waveform, reference is made to FIGURE 2, line 40B. Line 40B shows an audio input waveform with the feedback waveform generated in audio circuit 10 superimposed thereon. By noting the period in which the various steps of the feedback waveform occurs and comparing to the truth table, the primary pulse code at the output of comparison circuit 32 may be determined. Similarly, the operation of the comparison circuit 32 with respect to the comparison of the reference waveform and the correction command waveform may be more fully understood.

Basically, when the feedback waveform steps in the same direction as the reference waveform, such as at the beginning of a period 1, a 0 is generated at output of 32 and when the feedback waveform steps in the opposite direction from the reference waveform, a 1 is generated. Following this action in line 40B at point *a* the feedback waveform steps down, and this step occurs in period 1. In accordance with the truth table, this represents the absence of a pulse and consequently a 0 is generated. Note that this also coincides with the stepping down of the reference waveform on line 40A.

During the beginning of the second period at point *b*, the feedback waveform steps up and again a 0 is generated in accordance with the truth table. At point *c* in the following first period, the waveform steps up as a result of the increase of the audio input waveform, calling for the presence of a pulse and consequently a 1 is generated. Again, the reference waveform on line 40A has stepped down during this period, and this lack of coincidence is used to generate the 1. At point *d* in the next period 2, the feedback waveform steps down again requiring the generation of a 1.

In line 40B, the resulting primary pulse code generated for the illustrated exemplary waveform is shown below each step and can be easily followed by reference to the truth table or the reference waveform of line 40A. Line 40C of FIGURE 2 illustrates that the particular primary code generated for a given feedback waveform depends upon the initial phase of the reference waveform and the feedback waveform. The identical feedback waveform of line 40B is repeated in line 40C with the difference that it is shifted one period in phase to illustrate the fact that either of two complementary codes could describe the same input waveform. There is no ambiguity resulting in the receiver from this fact since the reversal of 1's and 0's will mean that one of the staircase generators will be stepping up while the other is stepping down and vice versa. A simple 180° phase shift in the audio waveform will result. While this phase shift has no significance with respect to voice reproduction, it may be removed by the synchronization method employed.

An important aspect of this invention with respect to operating advantageously in the presence of a non-symmetric error channel therefore lies in the utilization of alternate pulse presence and pulse absence to denote both increasing and decreasing modulation conditions, the correct interpretation of a given sequence being evident by certain features of the invention.

In other words, the meaning of a pulse present and pulse absence is periodically reversed so that commissive and omissive errors will average out over normal transmission times to have the same effect, thus obviating the need for a symmetric channel.

An object of this invention, as previously described, is the reduction of required pulses to transmit the input waveform characteristics. This invention accomplishes this desirable pulse reduction in two steps. The first step is to produce a primary pulse code and the second step is to eliminate certain unambiguous and redundant pulses inherent in the primary code. The resultant code contains the minimum possible number of pulses in accordance with the features of this invention.

In the illustration of FIGURE 2, the pulse train produced at the comparison circuit 32 output by increases and decreases of the input waveform has been shown, as well as the pulse train produced for a steady or non-changing signal. Of particular interest here is the latter pulse train form produced for a steady signal. For one particular phase condition, a sequence of zeros or pulse-absent condition resulted, while for the same condition but with opposite phase, a sequence of ones or pulse-present condition resulted. Insofar as the receiver is concerned, a shift of phase of one pulse frame would allow the steady signal represented by the sequence of ones to be transmitted by a sequence of zeros. It is this principle that is utilized in pulse eliminator 33 to greatly reduce the needed number of pulses. In accordance with this invention, this action is accomplished by logic circuits which eliminate pairs of pulses simultaneously. Thus a sequence of ones will be eliminated pair by pair. If such a sequence contains an even number of pulses, then all such pulses will be eliminated. However, if an odd number of pulses is present, then all but the final pulse will be eliminated. Similarly, where a transition from a stepped-up condition to a stepped-down condition exists, such that a pair of ones would normally be produced, such pair is eliminated. Effectively, this results in a shift of phase of the system from one phase to the opposite phase. Thus, the system adapts itself continuously to the phase which will require the minimum number of pulses. Unavoidably, a slight cost in resolution is entailed in this action. Where the shift from phase one to phase two occurs, an error in amplitude level equal to one quantizing step appears. However, at the high rate of sampling normally used for speech, this slight perturbation is effectively reduced by a low pass filter at the receiver output. Normally, this low-pass filter will have an upper cutoff frequency of approximately one-tenth of the system's sampling rate.

The voice-operated-switch characteristic of this invention is immediately apparent, for when no voice is being transmitted, the audio input is a steady zero level. The pulse generating circuitry will therefore produce a sequence of 0's in accordance with the operation of the pulse eliminator and this represents a pulse-absent condition. Thus, no signal is transmitted reducing both average power and pulse density in the transmission medium. This operation is virtually instantaneous since, a zero signal level which calls for a sequence of 1's will have its phase immediately shifted to the no-pulse condition.

FIGURE 3 represents a practical embodiment of the transmitter section of this invention in some detail, and FIGURES 4*a* and 4*b* illustrate waveforms present at points designated by numerals 100 through 117 of FIGURE 3. The audio signal to be transmitted is introduced by lead A to a comparator or difference circuit 21 which also has an input from a binary counter BC–1 of FIGURE 3. Line 100 of FIGURE 4*a* represents a typical audio waveform appearing at point A and the corresponding binary counter output B. The difference between the audio input and the binary counter input, shown in line 101, is amplified and inverted in amplifier A–1 which feeds the Schmitt trigger 22. The Schmitt trigger 22 serves to produce a unit step either positive or negative depending upon the polarity of the signal from amplifier A–1. Thus, a positive step is produced at the output of the trigger 22 when the counter waveform from binary counter BC–1 is greater than the audio input and a negative step is produced when this counter waveform is less than the audio input waveform. The output of trigger 22 is applied to AND gate G–2 and inverter I–1. This output is inverted by inverter I–1 and applied to gate G–1. When a positive step appears AND gate G–2 is opened allowing a pulse from clock oscillator 28 and 1-shot multivibrator MV–1 to appear at the "set" input of flip-flop FF–1. The pulse from multivibrator MV–1 is short compared with the clock period; a value of 2 microseconds being used for purposes of illustration. The clock frequency, which is the system sampling rate, is chosen in accordance with the fidelity of reproduction desired from the system and 40 kc./s. is used for purposes of illustration. Line 104 of FIGURE 4*a* shows the sequence of pulses present at the output of multivibrator MV–1. AND gate G–1 which feeds the "reset" input of bistable multivibrator FF–1 is connected to the output of the Schmitt trigger 22 through the unity-gain inversion stage I–1. The previously mentioned positive step at the trigger 22 ouput is inverted and therefore does not enable gate G–1. However, when a negative step appears at the output of trigger 22, AND gate G–2 is not enabled but the negative step is inverted by inverter I–1 becoming positive at AND gate G–1 thus enabling this gate. The clock pulse from multivibrator MV–1 then operates the "reset" input of flip-flop FF–1 Flip-flop FF–1 produces a pulse at ouput 24 in response to an input at the "set" terminal and similarly produces a pulse on output line 25 in response to a pulse at the "reset" input. Lines 102 and 103 of FIGURE 4*a* indicate the positive and negative steps present at the 0 and 1 outputs of flip-flop FF–1 on leads 25 and 24 in response to the audio input shown on line 100.

Referring now to the binary counter BC–1, this counter is made up from six or more flip-flops interconnected in a well-known manner to produce a binary count for successive inputs. It is more specifically a reversible binary counter in that a pulse at the "AND" input will count in an increasing fashion and a pulse at the "SUB" input will count in a decreasing or reversible fashion. The voltage output from each stage in the counter is weighted by the voltage divider action of an internal summing resistor and resistors connected to each stage. Thus, as the counter operates in response to a sequence of pulses on the "ADD" input, the voltage appearing on its summing resistor, and thus at the output, will increase in equal amplitude steps up to a maximum value of 64 or more steps, such number being chosen to be much greater than the number of quantizing steps of the system. If at any count the pulses at the "ADD" input cease and pulses appear at the "SUB" input then the counter would operate in reverse fashion, stepping down the voltage appearing at the output. The clock input from multivibrator MV–1 serves to trigger the binary counter BC–1 at the sampling rate such that a steady DC level at either the "ADD" or "SUB" input will cause repetitive counts.

As previously described, pulses will appear at the output of the flip-flop FF–1 on line 25 in response to negative steps appearing at the output of trigger 22. Such negative steps are caused by the counter BC–1 output waveform being smaller than the audio input wave at time of comparison. Thus, the output pulse on line 25 enters the counter BC–1 at the "ADD" input causing the counter to step up one step. This tends to bring the counter waveform in more close agreement with the input audio waveform. Conversely, for the situation wherein the counter waveform is greater than the audio waveform, a positive output will appear from the Schmitt trigger 22 enabling gate G–2 and causing a pulse to appear at output line 24 of the flip-flop FF–1. This produces a pulse on the "SUB" input of counter BC–1 thus causing the amplitude at the output to step down to more nearly match the audio input present at difference circuit 21. Thus, the combination of the difference circuit 21 and the reversible binary counter BC–1 is to form a feedback comparison circuit which compares at each clock sampling time the incoming waveform with the staircase-like output waveform of counter BC–1. This results in a staircase-like wave at the counter BC–1 output which approximates the incoming audio waveform.

Referring to FIGURE 4*a*, the counter BC–1 operation may be seen more clearly. Line 105 is the counting action of the "SUB" input and line 106 is the counting action of the "ADD" input resulting from the audio waveform on line 100. The pulse on line 105 causes the counter waveform output to step up one step, the next pulse which occurs on line 106 causes the counter waveform to step down and so on. The counter waveform output thus constructs, for this illustration, the waveform noted as B on line 100 of FIGURE 4*a*.

To produce the primary pulse code, a coincidence detector 32 is implemented by means of AND gates G–3 and G–4, and OR gate OR–1 in connection with flip-flop FF–

2 and delay line D–1. The flip-flop FF–2 is triggered from multivibrator MV–1 such that alternating square waves are produced at its two outputs, 26 and 27. As shown on line 108 of the waveforms, these two square wave streams are 180° out of phase. The clock pulse from multivibrator MV–1 is also applied to AND gates G–3 and G–4 through delay D–1 whose delay is less than the FF–2 output pulse width. For example, this delay may be 5 microseconds.

This delay serves to prevent gates G–3 and G–4 from being open during the transition time between the 1 and 0 output of flip-flop FF–2. The 1 output of flip-flop FF–1 on line 24 is applied to AND gate G–3 and the 0 output from flip-flop FF–1 on line 25 is applied to AND gate G–4. The action of this circuitry in producing pulses on the output line of OR gate OR–1 which has as its inputs the outputs of gates G–3 and G–4 will now be described.

While the truth table previously described sets forth the logic of this circuit, the order of this truth table is reversed in this preferred implementation for convenience.

The output is desired from the AND gates G–3 and G–4 for the 1 1 and the 0 0 relationships between flip-flop FF–1 and flip-flop FF–2. Conversely, no pulse output is desired for the 1 0 and 0 1 conditions with respect to these two flip-flops. Accordingly, when a pulse is present on line 24 representing a 1 from flip-flop FF–1 and a pulse is present on line 26 representing a 1 output from flip-flop FF–2, the AND gate G–3 will pass the pulse from multivibrator MV–1 via delay line D–1 which appears at the input of OR gate OR–1. Similarly, a pulse on line 25 representing a 0 from flip-flop FF–1 will appear at AND gate G–4 and a pulse on line 27 representing a 0 from flip-flop FF–2 will enable AND gate G–4 also passing the pulse from multivibrator through delay line D–1 to the other input of OR gate OR–1. When the opposite condition exists, i.e., a pulse on line 24 and a pulse on line 27 representing a 1 0 at AND gate G–3, the AND gate G–3 will be closed due to the absence of a pulse on line 26. Similarly, a 0 1 with respect to AND gate G–4 also causes gate G–4 to be closed due to the absence of a pulse on line 27. In both cases, the pulse from multivibrator MV–1 through delay line D–1 is blocked from OR gate OR–1. Line 110 of the waveforms illustrates the three inputs of AND gate G–3 and line 111 illustrates the three inputs of AND gate G–4 for the sample waveforms of this figure. The top line of each gate shows the clock pulse delayed 5 microseconds by delay line D–1. The middle line of each gate shows the two repetitive complementary outputs of flip-flop FF–2 and the bottom line of each gate indicates the 1 and 0 outputs of flip-flop FF–1 in response to the output of difference circuit 51. Line 112 indicates the output of AND gate G–3, where the clock pulse appears on this output when coincidence of pulses occur at the other two inputs, and where no clock pulse appears on this output when either or both of the other two inputs are absent. Line 113 shows the similar output of AND gate G–4.

The resulting pulse stream at the output of OR gate OR–1 represents the primary pulse code which is a feature of this invention. The succeeding circuitry shown at 33 in FIGURE 3 acts as a pulse-pair eliminator removing redundant pulse present in the primary pulse code. The first of a sequence of pulses at the output of OR gate OR–1 will appear at AND gate G–5 but will be inhibited due to lack of a pulse at the other input of AND gate G–5. The first pulse is delayed by one bit (25 microseconds) by delay line D–2. Thus, a second pulse following at the next sample time will pass through AND gate G–5 since it is enabled by the delayed initial pulse. Waveform line 114 illustrates the two inputs of AND gate G–5; the top line representing the output of OR gate OR–1 and the bottom line showing this pulse stream delayed by one bit (25 microseconds). Line 115 is the output of AND gate G–5 which occurs only when a first and second pulse occurs sequentially at the OR gate OR–1 output. This second pulse triggers one-shot multivibrator MV–2 which produces a pulse at its output of approximately 1½ sample period duration, for example 37 microseconds. This output represents an inhibit pulse for AND gate G–6. In addition to enabling AND gate G–5, the pulse present at the output of delay line D–2 is further delayed for a small percentage of the sample period interval by delay line D–3 and then applied to AND gate G–6. This delay is to allow time for multivibrator MV–2 to fire and may be, for example, 1 microsecond. Due to the inhibit pulse present on AND gate G–6, this delayed pulse does not appear at the output of AND gate G–6. However, if a third pulse occurs at the next sampling time at the output of OR gate OR–1, this pulse will be gated through AND gate G–5 but fails to trigger one-shot multivibrator MV–2 since it has not recovered from the previous triggering pulse. Further, this third pulse is delayed by the one sample period delay D–2 and when it appears at delay line D–3, the one-shot multivibrator pulse has recovered thus opening AND gate G–6. If no fourth pulse occurs at the OR gate OR–1 output, then the one-shot multivibrator MV–2 remains off and the delayed third pulse passes through AND gate G–6 and appears at the output. The above action is shown graphically on waveform lines 116 and 117. The top line of line 116 is the multivibrator MV–2 pulse and the bottom line is the same as line 114 delayed 1 microsecond by delay line D–3. The pulses on line 116 are seen to appear at the output of AND gate G–6 as shown on line 117 whenever the multivibrator MV–2 pulse is not present. Reviewing this action briefly, pairs of pulses occurring at the output of OR gate OR–1 are effectively blocked from appearing at the output of AND gate G–6. However, single pulses either occuring alone or as the final pulse of a sequence of an odd number of pulses will appear at the AND gate G–6 output.

In accordance with the above description, waveform line 117 represents the pulse train transmitted via the transmission medium to the receiver. It may be noted that for the illustrated waveform chosen in FIGURE 4*b* that a total of five pulses resulted on line 117 for about 24 sampling periods. Further, the effectiveness of the pulse elimination feature of this invention may be noted by referring back to line 105 which represents the primary pulse code. The pulse train of line 105 contains 13 pulses so therefore line 117 is to be seen to represent a greater than 2–1 improvement with respect to pulse density. The slight distortion resulting from the pulse elimination process will be shown later.

The operation of the receiving section of this invention will be explained by reference to the waveforms of FIGURE 5 and the receiver block diagram FIGURE 6. Line 118 of FIGURE 5*a* represents the illustrative signal of line 117 of FIGURE 4*b* as received and detected by conventional means, such as a radio receiver with an envelope detector, threshold circuit and pulse regenerator. It will be assumed that the regenerated pulses on line 118 will be of 2 microseconds duration and are received with no distortion purely for purposes of illustration. According to well-known characteristics of pulse transmission systems of this type, no degradation occurs from small deviations of pulse timing due to noise or interference.

In FIGURE 6, the pulse stream of line 118 is applied to AND gates G–7 and G–8. Simultaneously, the pulse stream is inverted by inverter I–2 as shown on line 119. The inverted pulse stream of line 119 is applied to AND gates G–9 and G–10. The receiver contains a clock 55 which is synchronized with the transmitter clock by means of an AFC circuit 56 which may be a phase locked loop and which receives its phase and frequency information from a synchronizing circuit 57, which may be a narrow band filter tuned to the fundamental sampling rate which is in this example considered to be 40 kc./s. The clock 55 drives a one-shot multivibrator MV–3 whose output is a sequence of 1 microsecond pulses as shown on line 122. The leading edge of this pulse stream is phased to occur about ½ microsecond later than the leading edge of the signal pulses on line 118. This pulse stream from the output of MV–3 is applied simultaneously to AND gates G–7, G–8, G–9, and G–10 and serve these pulses as readout or clocking pulses for these gates. Also, the pulse stream output from multivibrator MV–3 is applied to the triggering inputs of flip-flop FF–4 and causes square waves to appear at the 1 and 0 outputs of flip-flop FF–4 as illustrated on lines 120 and 121. The 0 output on line 121 of flip-flop FF–4 serves as the third input to AND gates G–8 and G–10 while the 1 output of this flip-flop on line 120 serves as the third input to AND gates G–7 and G–9. The OR gate OR–2 receives the outputs of G–7 and G–10 and the OR gate OR–3 receives the output of AND gates G–8 and G–9. For the signal pulses of line 118 as applied to the receiver, the outputs shown on lines G–7, G–8, G–9, and G–10 will appear as the outputs of the corresponding AND gates in accordance with the coincidences of the three inputs to each of these gates. Further, lines OR–2 and OR–3 show the corresponding OR gate outputs or these illustrated AND gate outputs.

OR gate OR–2 triggers the "set" input of flip-flop FF–3 and OR gate OR–3 triggers the "reset" input of this flip-flop. In response to the indicated set and reset inputs of lines OR–2 and OR–3, the 1 and 0 outputs of flip-flop FF–3 are shown on lines 123 and 124, respectively. The 1 output of flip-flop FF–3 represents the SUB input for binary counter BC–2 while the 0 output represents the ADD input of this binary counter. A clocking pulse from multivibrator MV–3 is delayed slightly by delay line D–4 and applied as the clock pulse for binary counter BC–2 causing it to step either up or down during every sampling period. This delay may be on the order of several microseconds. The staircase waveform output of binary counter BC–2 for the illustrated waveform of FIGURE 5 is shown on line 125. The slight delay due to delay line D–4 is neglected here for clarity. By following the add and subtract commands as shown lines 123 and 124, the manner in which the staircase waveform of 125 as built up may be easily followed. This staircase waveform may be filtered by sunbsequent low pass filter circuit 58 to recover substantially the original audio waveform which was illustrated on line 100 of FIGURE 4*a*.

The dotted line pulses or steps shown on line 125 are indicative of the one quantum level error that unavoidably occurs in the pulse pair elimination process previously described. It should be emphasized here that the exemplary waveform chosen has an amplitude excursion of about five quantum levels. In actual practice, the number of quantum levels achieved by a 40 kc./s. sampling rate will vary from as many as 40 for the lower audio frequencies to about 15 for the higher audio frequencies. For the frequencies most prevalent in voice about 25 to 30 levels will result. Consequently, the effect of this pulse elimination error is exaggerated in the waveform illustrated and in actual practice contributes a minor amount of signal-to-quantizing noise degradation.

As will therefore be seen, my invention provides at no additional cost in power or transmission rate, a system free from the deleterious effect of types of non-symmetrical errors present, thus providing a substantial improvement over existing systems of the incremental modulation type. Further, where a reduction in power and pulse density is advantageous, my invention provides a method of accomplishing this aim with a negligible reduction in signal quality as well as an instantaneous voice-operated switch characteristic.

While certain preferred configurations of my invention have been shown in some detail herein, I am not to be limited thereto except as required by the scope of the appended claims.

For example, whereas the locally generated reference waves have been shown to be square waves and the stepping waveforms have been described as staircase type waveforms, any other suitable waveforms may be used, such as, but not limited to, triangular waveforms, sawtooth waveforms, and waveforms having exponential rise and decay characteristics. Similarly, where transmission of audio waveforms has been discussed for purposes of illustration, it is within the scope of my invention to transmit other types of complex waveforms by selection of proper sampling rates consistent with fidelity of reproduction desired.

Also, although my invention has primary application to transmission of pulses by bursts of radio frequency energy, it is within the scope of this invention to include transmission by cable or by wire line carrier transmission, using either audio frequency or radio-frequency pulses.

I claim:

1. A pulse communication system for transmitting signals representing approximately a complex input waveform comprising means for sampling such complex input waveform, thereby generating a local waveform similar to such complex waveform, first comparison means for comparing the amplitude of said local waveform and said complex input waveform and for generating pulses constituting a first pulse stream representative of the result of said comparison of said waveforms, means for generating a transmitter reference waveform varying periodically between two amplitude levels, second comparison means for comparing said first pulse stream with said transmitter reference waveform, said second comparison means including means for producing in said comparison of said first pulse stream and said reference waveform a second pulse stream different from said first pulse stream, redundant pulse eliminator means arranged to receive the output of said second comparison means, said eliminator serving to eliminate redundant pulses from said second pulse stream, which latter pulses tend to occur when no change in amplitude of said complex input waveform is represented by a sequence of pulses present, and receiving means for receiving said second pulse stream, said receiving means comprising receiver reference waveform generator means for generating a receiver reference waveform, receiver comparison means for comparing said receiver reference waveform with said second pulse stream, comparison by said receiver comparison means producing a receiver pulse stream representative of said first pulse stream, and stepping waveform generator means arranged to accept said receiver pulse stream and be responsive thereto, said stepping waveform generator means recreating said complex input waveform in response to said receiver pulse stream.

2. A pulse type communication system utilizing transmitter and receiver, said transmitter comprising an input circuit for receiving an input complex waveform, first comparison means for comparing said input complex waveform with a feedback waveform, such feedback waveform being a staircase type reproduction of said input complex waveform, said comparison of said input complex waveform and said feedback waveform producing a first correction command pulse stream, said comparison producing a binary pulse of one polarity in said first correction command pulse stream when said input complex waveform is greater than a step in said feedback waveform and producing a binary pulse of the opposite polarity when said input complex waveform is less than a step in said feedback waveform; a staircase type waveform generator for producing said staircase type feedback waveform in response to said first correction command pulse stream by generating a positive step for each binary pulse of said one polarity appearing in said first correction command pulse stream and by generating a negative step for each binary pulse of said opposite polarity appearing in said first correction command pulse stream, second comparison means for receiving said first correction command pulse stream, latter comparison means including means for generating a second correction command pulse stream which is different from said first correction command pulse stream, a transmitter reference waveform generator for producing square waves at the same rate as and in synchronism with said staircase generator, and connected to deliver said square waves to said second comparison means, said second comparison means comparing said second correction command pulse stream with the square wave output of said transmitter reference waveform generator and by the coincidence or anti-coincidence of said square wave with pulses in said second correction command pulse stream, producing therefrom a primary pulse code in the form of a pulse stream containing pulses recurring at regularly spaced intervals such that one polarity of the comparison is represented by a pulse present and the opposite polarity represented by the absence of a pulse, with the sense of the pulse-present representation being periodically reversed by action of said comparator means for the purpose of eliminating the effects of unequal false error pulses and missing signal pulses, said second comparison means comprising first AND gate means for sensing coincidence of said first correction command pulse stream with one polarity of said square waves, such first AND gate means producing at its output a first pulse in response to such coincidence and producing at its output no pulse in response to lack of such coincidence, second AND gate means for sensing coincidence of said second correction command pulse stream with one polarity of said square waves, such polarity being at all times opposite in polarity to said comparison at said first AND gate means, such second AND gate means producing at its output a second pulse in response to such coincidence and producing at its output no pulse in response to lack of such coincidence, and OR gate means for passing said first and said second pulses, the combination of said first and said second pulses comprising said primary pulse stream, and receiver means for reconstituting the input waveform from said primary pulse code.

3. The pulse type communication system as defined in claim 2 in which said receiver means includes means for generating a periodically reversing receiver reference waveform, the latter waveform being identical to the output of said transmitter reference waveform generator, and receiver comparator means for comparing the received primary pulse code with said receiver reference waveform, said receiver comparator means being identical to said second comparison means in said transmitter, said receiver comparator means thus serving to operate in a complementary fashion to said transmitter second comparison means to remove the effect of the latter means in periodically reversing the sense of pulse polarities, thereby producing a receiver correction command pulse stream which is substantially identical with said first correction command pulse stream of said transmitter, and means for generating an output waveform from said receiver correction command pulse stream.

4. A pulse communication transmitter for transmitting a complex waveform by a periodic pulse stream which designates changes in amplitude of such complex waveform and which minimizes the number of transmitted pulses by elimination of pulses in such periodic pulse stream which can be considered redundant due to representing no change in amplitude of such complex waveform, wherein the improvement comprises transmitter means having input means for receiving a complex input waveform, and means for generating a first pulse stream representing increases in amplitude of such complex input waveform by the presence of a pulse, decreases in amplitude of such complex input waveform by the absence of a pulse, and no change in amplitude of such complex input waveform by an alternate pulse present and pulse absent condition, means for generating a second pulse stream substantially different from said first pulse stream, said second pulse stream representing an increase in amplitude of such complex input waveform by an alternate pulse present and pulse absent condition, representing a decrease in amplitude of such complex input waveform by an alternate pulse absent and pulse present condition, and no change in amplitude of such complex input waveform by either a sequence of pulses present or by a sequence of pulses absent, and redundant pulse eliminator means for modifying said second pulse stream by eliminating redundant pulses that occur when no change in amplitude of said complex input waveform is represented by a sequence of pulses present, such elimination of redundant pulses by said eliminator means causing such sequence of pulses present to be changed to a sequence of pulses absent, thereby enabling a reduced number of pulses to be transmitted.

5. A pulse communication transmitter for transmitting a complex waveform by a periodic pulse stream which designates changes in amplitude of such complex waveform and which minimizes the number of transmitted pulses by elimination of pulses in such periodic pulse stream which can be considered redundant due to representing no change in amplitude of such complex waveform, wherein the improvement comprises transmitter means including means for sampling a complex input waveform and from such waveform generating a local staircase type waveform similar to such complex input waveform, first comparison means for comparing the amplitude of said local waveform and said complex input waveform and generating pulses constituting a first pulse stream representing the result of said comparison, said first pulse stream representing increases in amplitude of such complex input waveform by the presence of a pulse, decreases in amplitude of such complex input waveform by the absence of a pulse, and no change in amplitude of such complex input waveform by an alternate pulse present and pulse absent condition, means for generating a transmitter reference waveform, varying periodically between two amplitude levels, second comparison means for comparing said first pulse stream with said transmitter reference waveform, said second comparison means producing as its output as the result of said comparison, a second pulse stream substantially different from said first pulse stream, said second pulse stream representing an increase in amplitude of such complex input waveform by an alternate pulse present and pulse absent condition, representing a decrease in amplitude of such complex input waveform by an alternate pulse absent and pulse present condition, and no change in amplitude of such complex input waveform by either a sequence of pulses present or by a sequence of pulses absent, and redundant pulse eliminator means arranged to receive the output of said second comparison means, said eliminator means serving to eliminate redundant pulses that occur when no change in amplitude of said complex input waveform is represented by a sequence of pulses present, said elimination of redundant pulses by said eliminator means causing such sequence of pulses present to be changed to a sequence of pulses absent, thereby reducing the number of pulses to be transmitted.

6. A pulse communication system for transmitting a complex waveform by a periodic pulse stream which designates changes in amplitude of such complex waveform and which minimizes the number of transmitted pulses by elimination of pulses in such periodic pulse stream which can be considered redundant due to representing no change in amplitude of such complex waveform, wherein the improvement comprises transmitter means including means for sampling a complex input waveform and from such waveform generating a local staircase type waveform similar to such complex input waveform, first comparison means for comparing the amplitude of said local waveform and said complex input waveform and generating pulses constituting a first pulse stream representing the result of said comparison, said first pulse stream representing increases in amplitude of such complex input waveform by the presence of a pulse, decreases in amplitude of such complex input waveform by the absence of a pulse, and no change in amplitude of such complex input waveform by an alternate pulse present and pulse absent condition, means for generating a transmitter reference waveform, varying periodically between two amplitude levels, second comparison means for comparing said first pulse stream with said transmitter reference waveform, said second comparison means producing as its output as the result of said comparison, a second pulse stream substantially different from said first pulse stream, said second pulse stream representing an increase in amplitude of such complex input waveform by an alternate pulse present and pulse absent condition, representing a decrease in amplitude of such complex input waveform by an alternate pulse absent and pulse present condition, and no change in amplitude of such complex input waveform by either a sequence of pulses present or by a sequence of pulses absent, and redundant pulse eliminator means arranged to receive the output of said second comparison means, said eliminator means serving to eliminate redundant pulses that occur when no change in amplitude of said complex input waveform is represented by a sequence of pulses present, said elimination of redundant pulses by said eliminator means causing such sequence of pulses present to be changed to a sequence of pulses absent, thereby reducing pulse density, means for transmitting the output of said eliminator means, receiver means for receiving the output from said transmitter means, said receiver means comprising receiver reference waveform generator means and receiver comparison means for respectively generating a reference waveform, and for comparing said reference waveform with the input to said receiver, such comparison producing a receiver pulse stream that is representative of said first pulse stream, and stepping waveform generator means arranged to accept said receiver pulse stream, to create therefrom a reproduction of said complex input waveform.

References Cited

UNITED STATES PATENTS

| | | | |
|---|---|---|---|
| 2,817,061 | 12/1957 | Bowers | 332—11 |
| 3,038,029 | 6/1962 | Carbrey | 178—66 X |
| 3,213,268 | 10/1965 | Ellersick | 179—15.55 X |

JOHN W. CALDWELL, *Primary Examiner.*

DAVID G. REDINBAUGH, *Examiner.*

S. J. GLASSMAN, J. T. STRATMAN, *Assistant Examiners.*